(12) United States Patent
Walker et al.

(10) Patent No.: US 11,016,734 B1
(45) Date of Patent: May 25, 2021

(54) CHIP DITHERING USING PERMUTED RANDOMIZED SELECTION SETS TO ENHANCE THE LPI/LPD CHARACTERISTICS OF A WAVEFORM

(71) Applicant: NORTHROP GRUMMAN SYSTEMS CORPORATION, Falls Church, VA (US)

(72) Inventors: Christopher W. Walker, Rancho Palos Verdes, CA (US); Ameesh N. Pandya, Los Angeles, CA (US); Yen M. Hoang, Anaheim, CA (US); Ryan K. Cole, Hermosa Beach, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 13 days.

(21) Appl. No.: 16/777,501

(22) Filed: Jan. 30, 2020

(51) Int. Cl.
*G06F 7/58* (2006.01)
*H04J 13/00* (2011.01)
*H04B 1/707* (2011.01)

(52) U.S. Cl.
CPC ............. *G06F 7/582* (2013.01); *H04B 1/707* (2013.01); *H04J 13/0018* (2013.01)

(58) Field of Classification Search
CPC ........ H04B 1/707; H04B 1/709; H04B 1/713; H04J 13/0018; H04J 13/0022; H04J 13/0025; H04J 13/10; G06F 7/58; G06F 7/582; G06F 7/588
USPC ............... 375/130, 133, 135, 140, 141, 146; 370/335, 342; 708/250, 255
See application file for complete search history.

(56) References Cited

U.S. PATENT DOCUMENTS

| | | | |
|---|---|---|---|
| 6,141,332 A * | 10/2000 | Lavean | H04B 1/707 370/208 |
| 8,731,021 B2 | 5/2014 | Greenberg | |
| 2009/0310650 A1* | 12/2009 | Chester | H04J 13/0018 375/146 |
| 2010/0260124 A1* | 10/2010 | Noshio | H04W 72/042 370/329 |
| 2010/0310072 A1* | 12/2010 | Michaels | H04B 1/707 380/263 |
| 2011/0002463 A1* | 1/2011 | Michaels | H04L 9/0662 380/268 |

* cited by examiner

*Primary Examiner* — Young T. Tse
(74) *Attorney, Agent, or Firm* — John A. Miller; Shumaker, Loop & Kendrick, LLP

(57) ABSTRACT

A communications system that pseudo-randomly dithers the widths of chips that are multiplied by bit symbols for spread spectrum purposes. The system includes a first random sequence generator that generates a first sequence of random numbers at a sample rate and a decision processor responsive to the first sequence of random numbers that generates a separate command at the sample rate each time one of the random numbers exceeds a predetermined threshold. The system further includes a second random sequence generator that generates select random numbers, where the second random number generator changes the select random number each time it receives one of the commands. The system also includes a chip width processor responsive to the random numbers from the second random sequence generator, where the chip width processor selects a new set of chips each having a certain width in response to receiving each random number.

20 Claims, 1 Drawing Sheet

CHIP DITHERING USING PERMUTED RANDOMIZED SELECTION SETS TO ENHANCE THE LPI/LPD CHARACTERISTICS OF A WAVEFORM

BACKGROUND

Field

This disclosure relates generally to a communications system that pseudo-randomly dithers the widths of chips that are multiplied by bit symbols for spread spectrum transmission purposes and, more particularly, to a communications system that pseudo-randomly dithers the widths of chips that are multiplied by bit symbols for spread spectrum transmission purposes, where a first random sequence generator determines when the widths of the chips are changed and a second random sequence generator determines what the widths are changed to.

Discussion of the Related Art

Digital communications systems typically map or translate a stream of encoded information bits to be transmitted into a constellation of symbols, where each symbol defines a group of the bits. For example, a bit mapper may employ M-ary phase shift keying (MPSK) that provides in-phase and quadrature-phase components for each symbol that is transmitted. The mapped symbols are then modulated onto a waveform, filtered and converted to an analog signal for transmission. When the analog signal is received by a receiver, the signal is converted to a digital signal to remove the carrier and the digital signal is demodulated to recover the bit symbols, which requires knowledge of the time and position of the individual symbols in the signal to correctly determine the value of each symbol. The information bits are then extracted from the bit symbols.

For certain applications, it is desirable to transmit a data or communications signal without that signal being detected by someone else, such as an adversary, i.e., the adversary does not know that a signal is being transmitted, typically for various low probability of interception/low probability of detection (LPI/LPD) communications applications. One approach is to spread the energy of the transmitted signal, which would normally be transmitted over a relatively narrow frequency band, over a wide frequency band or spectrum, known in the art as direct-sequence spread spectrum processing, so that the signal energy is washed out in the background and is not readily detectable. This is generally accomplished by multiplying the bit symbol waveform by a rapidly changing spreading pseudo noise (PN) code having chips defined by a logical 0 or 1, where the chips are changing must faster than the symbols, which spreads out the energy of the transmitted signal. In other words, a bit symbol that may be modulated and transmitted over a certain time is converted to a large number of random bits, such as ones and minus ones, that are modulated and transmitted over the same time. Thus, the transmitted waveform changes rapidly over that time, much faster than the original symbol sequence, which is what expands the bandwidth. However, the receiver has prior knowledge that the signal is being transmitted and over what frequency band, and is able to synchronize to the signal, remove the spreading code from the waveform and compress the signal to decipher the information.

As detection systems become more sophisticated they become increasingly able to detect signal energy over a wide frequency band and identify that a signal is being transmitted. In response to the increase in sophistication of these detection systems, transmission systems have been devised that "dither" the chips so that they don't all have the same width, i.e., transmission time, to have different PN codes spread over different bandwidths. However, in the known techniques, the number of chip widths that can be selected for the chips are limited, which limits the effectiveness of disguising the signal being transmitted.

DETAILED DESCRIPTION OF THE EMBODIMENTS

The following discussion of the embodiments of the disclosure directed to a communications system that pseudo-randomly dithers the widths of chips that are multiplied by bit symbols for spread spectrum transmission purposes is merely exemplary in nature, and is in no way intended to limit the disclosure or its applications or uses.

Figure 1:
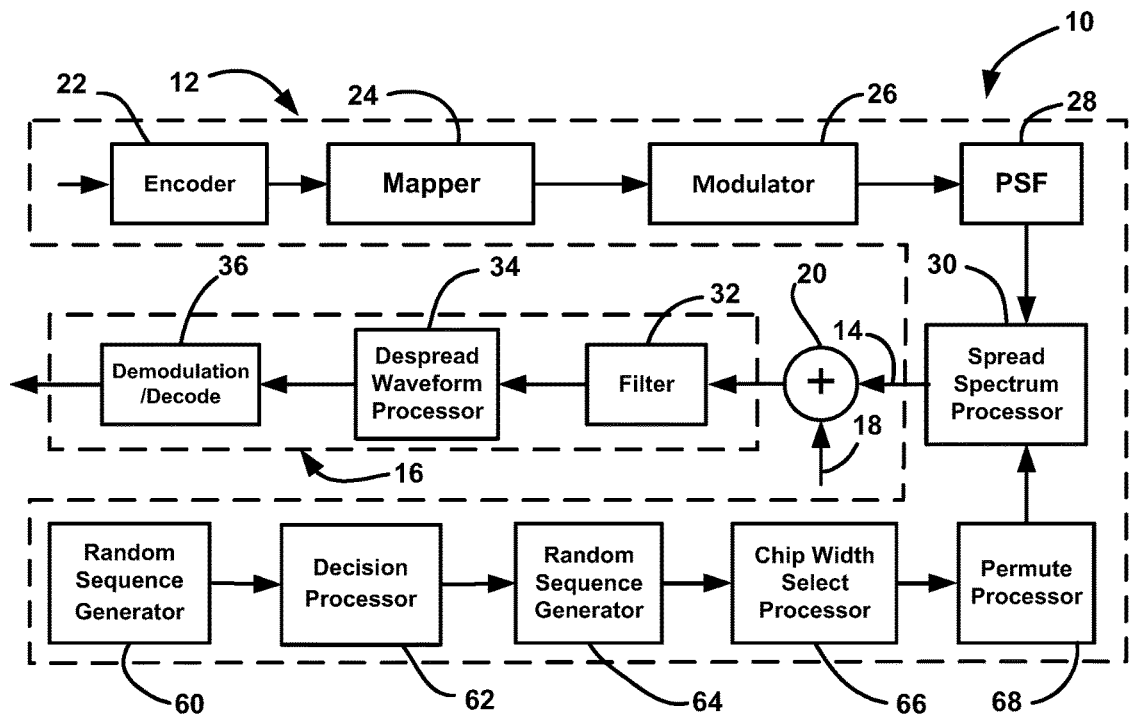
FIG. 1 is a schematic block diagram of a communications system that pseudo-randomly dithers the widths of chips that are multiplied by bit symbols for spread spectrum purposes.

FIG. 1 is a schematic block diagram of a digital communications system 10 that includes a transmitter 12 that transmits a data or other communications signal over a wireless communications channel 14 that is received by a receiver 16, where white Gaussian noise is added to the received signal in the receiver 16 on line 18 at a summation junction 20 to provide modeling for thermal background noise. The transmitter 12 includes an encoder 22 that receives a stream of digital information bits to be transmitted, where the encoder 22 adds redundant bits to the information bits to be transmitted for error correction purposes and provides a stream of encoded bits. The coded digital bits from the encoder 22 are sent to a mapper 24 that translates the bits into a constellation of bit symbols, for example, using M-ary phase shift keying (MPSK) that provides in-phase and quadrature-phase components for each symbol that is transmitted in a manner well understood by those skilled in the art. The bit symbols are then modulated onto a waveform in a modulator 26 and the modulated waveform is provided to a pulse-shaping filter (PSF) 28, such as a square-root raised cosine (SRRC) filter that, for example, interpolates the symbol sequence and shapes the waveform as a square-root raised cosine for converting the digital signal to an analog signal.

The filtered symbols are then multiplied by a fast changing and dithered PN chip sequence in a spread spectrum processor 30 to spread the transmitted energy over a wider frequency, where the manner in which the chip sequence is generated for the system 10 is discussed in detail below. The PN chip sequence is generally a series of logical 0s and 1s known as chips, typically provided to as −1s and +1s for the multiplication process. There are many chips per symbol, where the fast rate that the chip sequence changes is what spreads out the energy in the frequency domain. The multiplied digital signal having the spread out energy is then converted to an analog signal by a digital-to-analog converter (DAC) (not shown) and modulated onto a carrier waveform for transmission on the channel 14, where two samples are required for converting a chip to an analog signal, and where a sample of a chip is the value of the chip at a particular point in time.

The summed signal from the summation junction 20 received by the receiver 16 is converted to a digital signal by an analog-to-digital converter (ADC) (not shown) and then filtered by a filter 32 to remove background. The filtered digital signal is then sent to a despreading waveform processor 34 to remove the PN spreading waveform having the chips to recreate the symbols and the symbols are demodulated and decoded in a processor 36 to convert the symbols back to bits, decode the coded bits and extract the information bits in a manner well understood by those skilled in the art.

Figure 2:
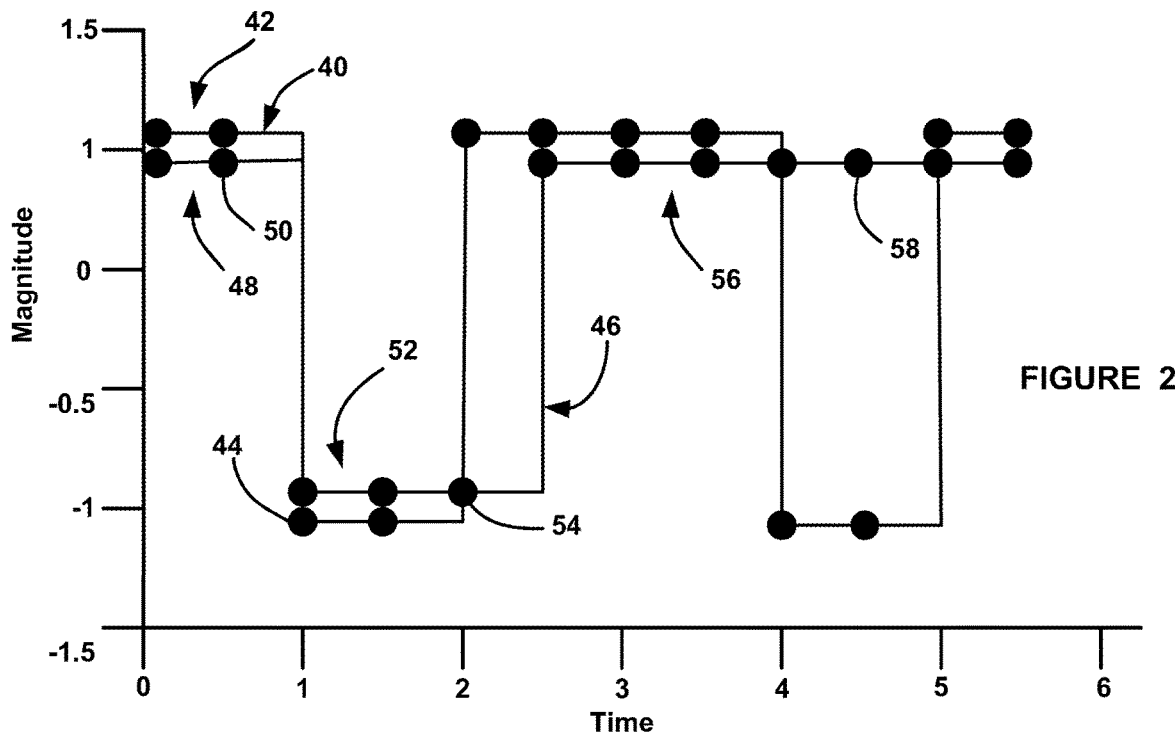
FIG. 2 is a graph with time on the horizontal axis and chip magnitude on the vertical axis showing the relationship between a fixed chip width waveform and dithered chip width waveform.

This disclosure proposes a technique for varying the width of the chips, i.e., the duration of the chips, in an innovative manner so that for a constant sampling rate, chip widths occur having more than two samples, where there is a greater selection of those wider chips, and where the width of a chip determines the number of samples in the chip depending on where those samples occur within the chip. FIG. 2 is a graph with time on the horizontal axis and magnitude on the vertical axis that can be used to illustrate the difference between a constant width PN chip sequence having two samples per chip and a dithered width PN chip sequence having two or more samples per chip. Particularly, the graph shows a fixed chip width waveform 40 including fixed chips 42 each having two samples 44 with a magnitude of either 1 or −1, where the chip sequence is 1, −1, 1, 1, −1, 1. The graph also shows a dithered chip width waveform 46 including dithered chip widths, particularly a chip 48 having two samples 50, a chip 52 having three samples 54 and a chip 56 having seven samples 58, where the chip sequence is over the same time as the fixed waveform 40 is 1, −1, 1. It is noted that the actual number of samples that occur per dithered chip width will depend on when those samples occur within the chip.

In order to generate the dithered chip widths in the innovative manner referred to above, the transmitter 12 includes a first random sequence generator 60, for example, a PN generator that continuously generates random numbers, for example, between 0 and 1, that are sent to a decision processor 62 at a certain sample rate that determines if the number it receives at any particular point in time is above a certain threshold, such as a threshold greater than or equal to 0 and less than 1, for example, 0.5. If the random number does exceed the threshold, the processor 62 sends a command to a second random sequence generator 64. The second sequence generator 64 also generates and outputs random numbers, but does not change the number it is currently outputting at the sample rate unless it receives the command from the decision processor 62, where it is the command that causes the sequence generator 64 to change the number it is currently outputting. The random number from the sequence generator 64 is sent to a chip width select processor 66 that selects a certain chip width set, i.e., a number of chips each having a certain width, based on the value of the number. Therefore, if the random sequence generator 60 does not generate a number above the threshold, then the current chip width set being transmitted doesn't change, but if the random sequence generator 60 does generate a number above the threshold, then the current chip width set being transmitted does change. The new chip width set is selected from a library of chip width sets in the generator 64 based on the value of the number from the generator 64. The chip width set that is provided by the processor 66 is then permuted in a permute processor 68 so that the order of the chips in the set is pseudo-randomly altered, and thus, the same chip width set won't have the same order from one sample time that it is selected to the next sample time it is selected. Further, the permute processor 68 pseudo-randomly changes the sequence of the chips in the chip set even if the chip set has not been changed by the processor 66. The chips are then multiplied by the modulated symbols from the filter 28 in the processor 30 for transmission, as discussed above.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A communications system comprising:
   a mapper that converts a series of information bits to a series of bit symbols;
   a spread spectrum processor that multiplies the series of bit symbols by a sequence of chips, where a width of a chip determines the number of samples in the chip depending on where the samples occur within the chip;
   a first random sequence generator that generates a first sequence of decision random numbers at a sample rate;
   a decision processor responsive to the first sequence of decision random numbers and generating a separate command at the sample rate each time one of the decision random numbers exceeds a predetermined threshold;
   a second random sequence generator generating a select random number and being responsive to the commands, said second random sequence generator changing the select random number each time it receives one of the commands; and
   a chip width processor responsive to the select random numbers from the second random sequence generator, said chip width processor selecting at least one new chip having a width depending on the value of the select random number, where the new chip is provided to the spread spectrum processor to be multiplied by the series of bit symbols.

2. The system according to claim 1 wherein the chip width processor selects a plurality of new chips each having a certain width as a set of chips in response to receiving each select random number.

3. The system according to claim 2 further comprising a permute processor that receives the set of chips from the chip width processor before the chips are sent to the spread spectrum processor, said permute processor changing the order of the chips in the set of chips.

4. The system according to claim 3 wherein the permute processor changes the order of the chips in the set of chips regardless of whether the chip width processor changes the set of chips.

5. The system according to claim 1 wherein the chip width processor selects the new chips from a pre-set library of chips.

6. The system according to claim 1 wherein the first random sequence generator is a pseudo noise random sequence generator.

7. The system according to claim 1 wherein the first sequence of decision random numbers are between 0 and 1.

8. The system according to claim 7 wherein the threshold is greater than or equal to 0 and less than 1.

9. A communications system comprising:
a mapper that converts a series of information bits to a series of bit symbols;
a spread spectrum processor that multiplies the series of bit symbols by a sequence of chips, where a width of a chip determines the number of samples in the chip depending on where the samples occur within the chip;
a random sequence generator generating a select random number and being responsive to commands, said random sequence generator changing the random number each time it receives the command;
a chip width processor responsive to the random numbers from the random sequence generator, said chip width processor generating a plurality of new chips each having a certain width as a set of chips in response to receiving each random number depending on the value of the random number, where the set of chips is provided to the spread spectrum processor to be multiplied by the series of bit symbols; and
a permute processor responsive to the set of chips from the chip width processor and changing the order of the chips in the set of chips.

10. The system according to claim 9 wherein the permute processor changes the order of the chips in the set of chips regardless of whether the chip width processor changes the set of chips.

11. The system according to claim 9 wherein the chip width processor selects the new chips from a pre-set library of chips.

12. A method for providing spread spectrum transmission in a communications system, said method comprising:
converting a series of information bits to a series of bit symbols;
multiplying, by a spread spectrum processor, the series of bit symbols by a sequence of chips, where a width of a chip determines the number of samples in the chip depending on where the samples occur within the chip;
generating a first sequence of decision random numbers at a sample rate;
generating a separate command at the sample rate each time one of the decision random numbers exceeds a predetermined threshold;
generating a select random number and changing the select random number each time one of the commands is generated; and
selecting at least one new chip having a width depending on the value of the select random number, where the new chip is provided to the spread spectrum processor to be multiplied by the series of bit symbols.

13. The method according to claim 12 wherein selecting the at least one new chip includes selecting a plurality of new chips each having a certain width as a set of chips in response to receiving each select random number.

14. The method according to claim 13 further comprising changing the order of the chips in the set of chips.

15. The method according to claim 14 wherein changing the order of the chips in the set of chips includes changing the order of the chips in the set of chips regardless of whether the set of chips is changed.

16. The method according to claim 12 wherein selecting the at least one new chip includes selecting the new chips from a pre-set library of chips.

17. The method according to claim 12 wherein generating the sequence of decision random numbers includes generating a pseudo noise sequence of decision random numbers.

18. The method according to claim 12 wherein the sequence of decision random numbers are between 0 and 1.

19. The method according to claim 18 wherein the threshold is greater than or equal to 0 and less than 1.

20. The method according to claim 19 wherein the threshold is 0.5.

* * * * *